United States Patent
Chang et al.

(10) Patent No.: US 12,423,724 B2
(45) Date of Patent: Sep. 23, 2025

(54) LOCATION-BASED ASSIGNMENT OF SHOPPER-LOCATION PAIRS

(71) Applicant: Maplebear Inc., San Francisco, CA (US)

(72) Inventors: Rockson Chang, Somerville, MA (US); Licheng Yin, Burlingame, CA (US); Chen Zhang, San Jose, CA (US); Michael Chen, San Francisco, CA (US); Aaron Dou, Santa Clara, CA (US); Radhika Anand, Sunnyvale, CA (US); Nicholas Sturm, Denver, CO (US); Ajay Pankaj Sampat, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 176 days.

(21) Appl. No.: 17/877,758

(22) Filed: Jul. 29, 2022

(65) Prior Publication Data
US 2024/0037588 A1 Feb. 1, 2024

(51) Int. Cl.
*G06Q 30/0204* (2023.01)
*G06Q 10/0635* (2023.01)
*G06Q 10/0836* (2023.01)
*G06Q 30/0207* (2023.01)

(52) U.S. Cl.
CPC ..... *G06Q 30/0205* (2013.01); *G06Q 10/0635* (2013.01); *G06Q 10/0836* (2013.01); *G06Q 30/0222* (2013.01)

(58) Field of Classification Search
CPC .......... G06Q 30/0205; G06Q 10/0635; G06Q 10/0836; G06Q 30/0222
See application file for complete search history.

(56) References Cited

U.S. PATENT DOCUMENTS

| | | | |
|---|---|---|---|
| 11,164,195 B2 * | 11/2021 | Moore, Jr. | G06Q 10/067 |
| 11,341,554 B1 * | 5/2022 | Sturm | G06Q 30/0235 |
| 11,641,554 B2 * | 5/2023 | Hasegawa | H01L 29/84 367/181 |
| 2020/0219171 A1 * | 7/2020 | Zhuang | G06Q 30/0635 |
| 2022/0044299 A1 | 2/2022 | Tate et al. | |
| 2022/0374967 A1 * | 11/2022 | Bronicki | G06Q 30/0627 |
| 2022/0383401 A1 * | 12/2022 | Bronicki | G06Q 30/0261 |

(Continued)

OTHER PUBLICATIONS

PCT International Search Report and Written Opinion, PCT Application No. PCT/US22/50156, Feb. 21, 2023, 17 pages.

*Primary Examiner* — Dylan C White
(74) *Attorney, Agent, or Firm* — Fenwick & West LLP (57) ABSTRACT

The present disclosure is directed to determining shopper-location pairs. In particular, the methods and systems of the present disclosure may identify a set of available shoppers associated with an online shopping concierge platform and located in a geographic area; identify a set of available warehouse locations associated with the online shopping concierge platform and located in the geographic area; and determine, based at least in part on the set of available shoppers, the set of available warehouse locations, and one or more machine learning (ML) models, a set of shopper-location pairs optimized based at least in part on time required by the set of available shoppers to travel from their respective current locations to one or more of the set of available warehouse locations.

20 Claims, 8 Drawing Sheets

(56) References Cited

U.S. PATENT DOCUMENTS

| | | | | |
|---|---|---|---|---|
| 2023/0222529 | A1* | 7/2023 | He | G06N 3/084 |
| | | | | 705/7.34 |
| 2023/0251279 | A1* | 8/2023 | Kumagai | G01N 35/10 |
| | | | | 422/63 |
| 2023/0252556 | A1* | 8/2023 | Ward | G06Q 30/0639 |
| | | | | 705/26.9 |
| 2023/0394551 | A1* | 12/2023 | Tate | G06Q 30/0625 |
| 2024/0029102 | A1* | 1/2024 | Fox | G06Q 30/0621 |

* cited by examiner

Relocation score
- Heuristic estimation of likelihood to relocate based on distance to WHL
- Median distance = median shopper-WHL distance at batch accept
- Sigma = median_distance * relocation_distance_scale_factor $$\frac{1}{\sigma_i \sqrt{2\pi}} \exp\left(-\frac{r_{ij}^2}{2\sigma_i^2}\right)$$

Store preference score
- Heuristic estimation of shopper store / warehouse preference
- Based on batches completed in past 28 days
- Epsilon = min_relocation_score *

$$\max\left[\left(\frac{b_{ij}}{\sum_j b_{ij}}\right)^2 + \left(\frac{c_{ijk}}{\sum_k c_{ijk}}\right)^2 + \epsilon\right]$$

Likelihood to relocate
- P = relocation_score * store_preference score

FIG. 6A

For the set of shoppers $S$ and warehouse locations $\mathcal{W}$ in the solve region Maximize $\sum_{i \in S} \sum_{j \in \mathcal{W}} p_{ij} x_{ij} (r_{ij} - \lambda q_{ij})$ Under constraints:

$x_{ij} \in \{0, 1\}, \forall i, j$ $\sum_{j \in \mathcal{W}} x_{ij} \in \{0, 1\}, \forall i$ $\sum_{i \in S} p_{ij} x_{ij} + s_j \geq f D_j, \forall j$ Where the parameters are defined as:

- $x_{ij}$ is a binary decision variable for assignment of shopper i to WHL j
- $p_{ij}$ is a weighting term for the likelihood for shopper i to reposition to WHL j
- $r_{ij}$ is the distance from shopper i to WHL j
- $q_{ij}$ is a weighting term for the likelihood of shopper i having a negative experience at WHL j
- $\lambda$ is the penalty for a negative shopper experience, e.g. paid recourse
- $D_j$ is the forecasted demand for priority orders at WHL j
- $d_s$ is the number of estimated deliveries for shopper i
- $s_j$ is the sum of estimated deliveries already allocated for WHL j
- $f$ is a hyperparmeter for the fraction of the demand to fill [0-1]

LOCATION-BASED ASSIGNMENT OF SHOPPER-LOCATION PAIRS

BACKGROUND

Online shopping concierge platforms may link shoppers with customers, enabling customers to request and receive products located at various remote geographic locations. To increase the efficiency of such platforms, customers, shoppers, and locations may be matched based on a wide variety of criteria, and/or the like.

SUMMARY

Aspects and advantages of embodiments of the present disclosure will be set forth in part in the following description, or may be learned from the description, or may be learned through practice of the embodiments.

One example aspect of the present disclosure is directed to a method. The method may include identifying, by one or more computing devices, a set of available shoppers associated with an online shopping concierge platform and located in a geographic area. The method may also include identifying, by the computing device(s), a set of available warehouse locations associated with the online shopping concierge platform and located in the geographic area. The method may further include determining, by the computing device(s) and based at least in part on the set of available shoppers, the set of available warehouse locations, and one or more machine learning (ML) models, a set of shopper-location pairs optimized based at least in part on time required by the set of available shoppers to travel from their respective current locations to one or more of the set of available warehouse locations. The method may further include generating, by the computing device(s) and based at least in part on the set of shopper-location pairs, communications at least one of dispatching, instructing, incentivizing, or encouraging at least a portion of the available shoppers to relocate from their respective current locations to the one or more of the set of available warehouse locations. The method may further include transmitting, by the computing device(s) and to one or more computing devices associated with the at least a portion of the available shoppers, the communications at least one of dispatching, instructing, incentivizing, or encouraging the at least a portion of the available shoppers to relocate from their respective current locations to the one or more of the set of available warehouse locations.

Another example aspect of the present disclosure is directed to a system. The system may include one or more processors, and a memory storing instructions that when executed by the processor(s) cause the system to perform operations, e.g., for each shopper of a set of available shoppers associated with an online shopping concierge platform and located in a geographic area. The operations may include identifying a set of available warehouse locations associated with the online shopping concierge platform and located in the geographic area. The operations may also include determining, based at least in part on the set of available warehouse locations and one or more machine learning (ML) models, a set of shopper-location pairs optimized based at least in part on time required by the shopper to travel from their current location to one or more of the set of available warehouse locations. The operations may further include generating, based at least in part on the set of shopper-location pairs, communications at least one of dispatching, instructing, incentivizing, or encouraging the shopper to relocate from their current location to the one or more of the set of available warehouse locations. The operations may further include transmitting, to one or more computing devices associated with the shopper, the communications at least one of dispatching, instructing, incentivizing, or encouraging the shopper to relocate from their current location to the one or more of the set of available warehouse locations.

A further example aspect of the present disclosure is directed to one or more non-transitory computer-readable media comprising instructions that when executed by one or more computing devices cause the computing device(s) to perform operations. The operations may include determining, based at least in part on a set of available shoppers associated with an online shopping concierge platform, a set of available warehouse locations associated with the online shopping concierge platform, and one or more machine learning (ML) models, a set of shopper-location pairs optimized based at least in part on time required by the set of available shoppers to travel from their respective current locations to one or more of the set of available warehouse locations. The operations may also include generating, based at least in part on the set of shopper-location pairs, communications at least one of dispatching, instructing, incentivizing, or encouraging at least a portion of the available shoppers to relocate from their respective current locations to the one or more of the set of available warehouse locations. The operations may further include transmitting, to one or more computing devices associated with the at least a portion of available shoppers, the communications at least one of dispatching, instructing, incentivizing, or encouraging the at least a portion of the available shoppers to relocate from their respective current locations to the one or more of the set of available warehouse locations.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
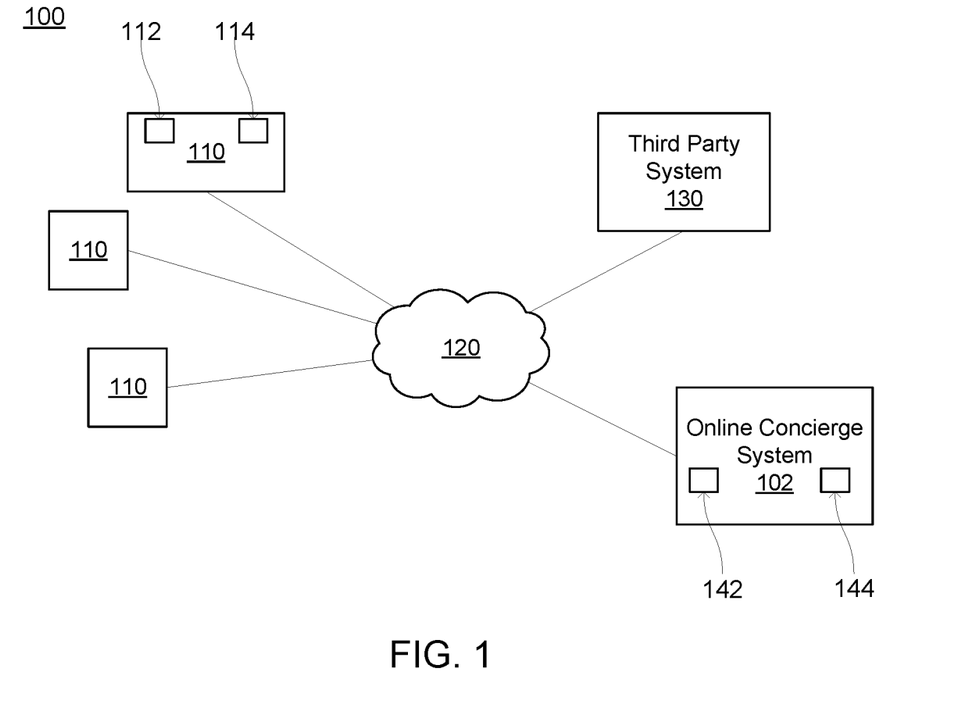
FIG. 1 is a block diagram of a system environment in which an online system, such an online concierge system, operates, according to example embodiments of the present disclosure.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2 and 5-7. For example, the memory 144 may have instructions encoded thereon that, when executed by the processor 142, may cause the processor 142 to identify a set of available shoppers associated with the online concierge system and located in a geographic area, identify a set of available warehouse locations associated with the online concierge system and located in the geographic area, determine (e.g., based at least in part on the identified sets of available shoppers and warehouse locations, one or more machine learning (ML) models, and/or the like) a set of shopper-location pairs, for example, optimized based at least in part on time required by the set of available shoppers to travel from their respective current locations to one or more of the set of available warehouse locations, and/or the like. Additionally, the online concierge system 102 may include a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-7, and may include specific computing components such as processors, memories, communication interfaces, and/or the like.

System Overview

Figure 2:
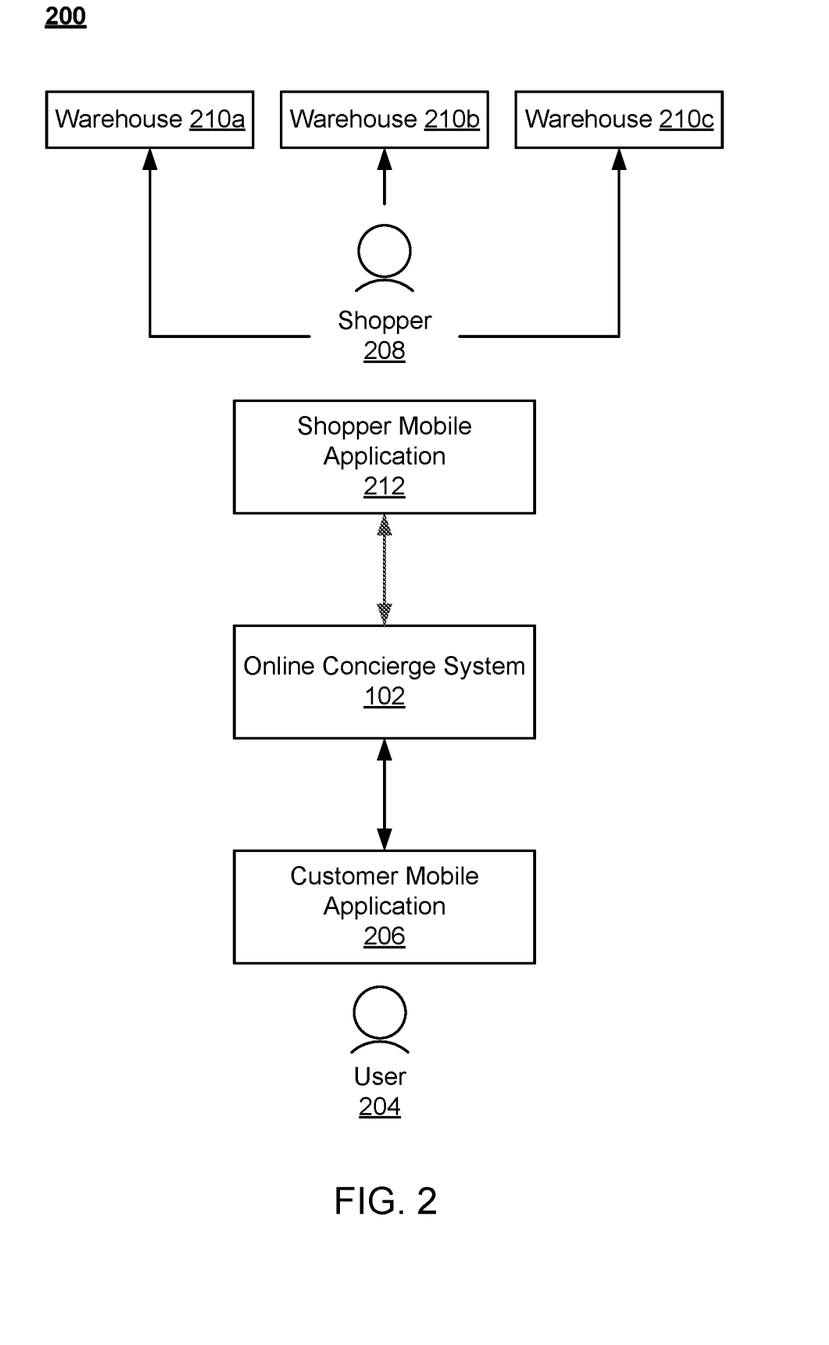
FIG. 2 illustrates an environment of an online shopping concierge service, according to example embodiments of the present disclosure.

FIG. 2 illustrates an environment 200 of an online platform, such as an online concierge system 102, according to example embodiments of the present disclosure. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
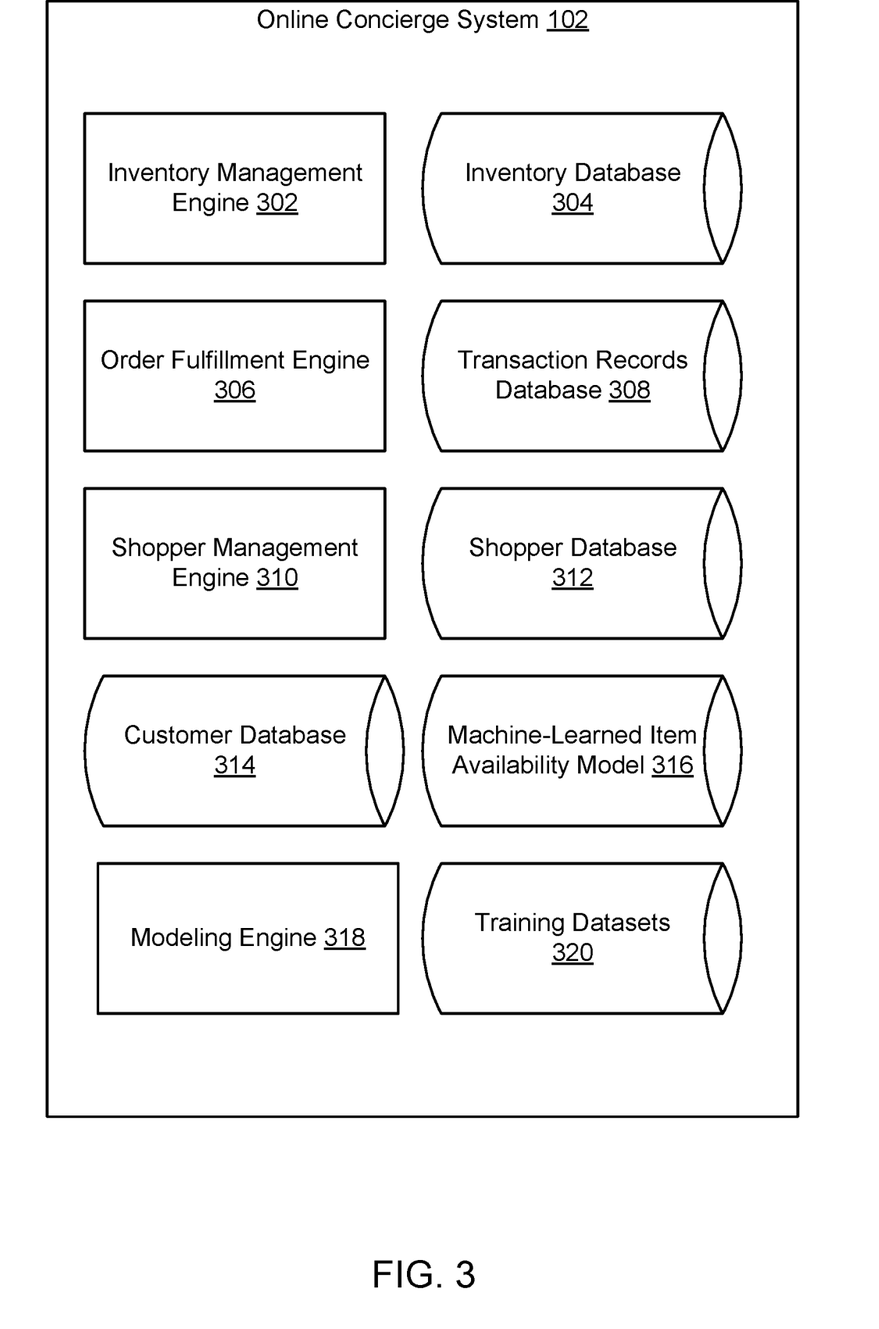
FIG. 3 is a diagram of an online shopping concierge system, according to example embodiments of the present disclosure.

FIG. 3 is a diagram of an online concierge system 102, according to example embodiments of the present disclosure. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 202 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category).

The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
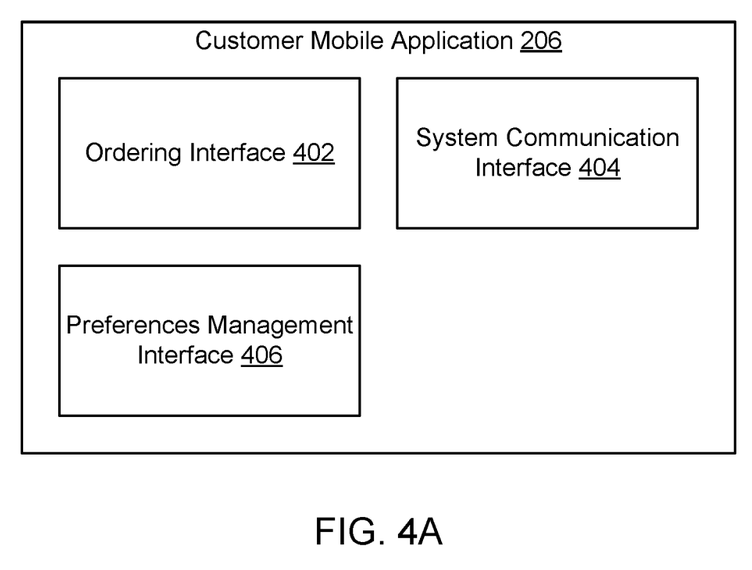
FIG. 4A is a diagram of a customer mobile application (CMA), according to example embodiments of the present disclosure.

FIG. 4A is a diagram of the customer mobile application (CMA) 206, according to example embodiments of the present disclosure. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
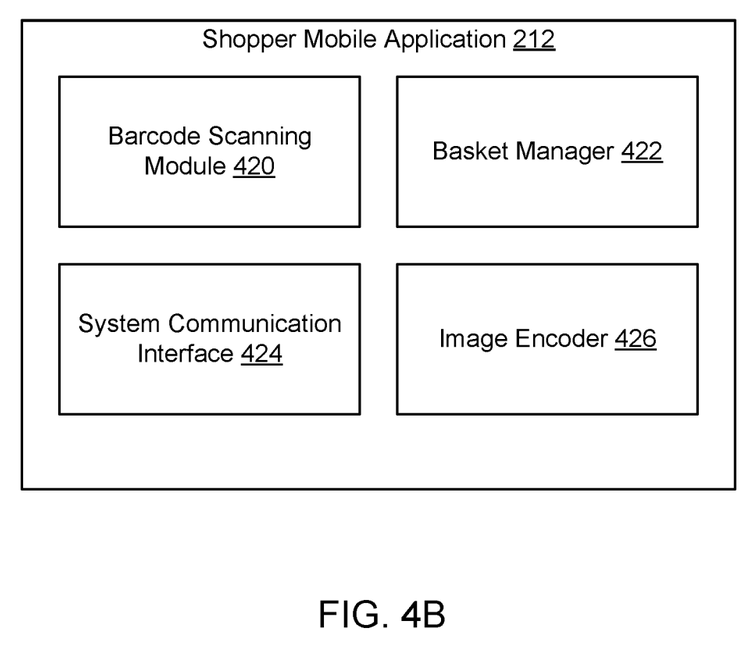
FIG. 4B is a diagram of a shopper mobile application (SMA), according to example embodiments of the present disclosure.

FIG. 4B is a diagram of the shopper mobile application (SMA) 212, according to example embodiments of the present disclosure. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Determining Shopper-Location Pairs

Figure 5:
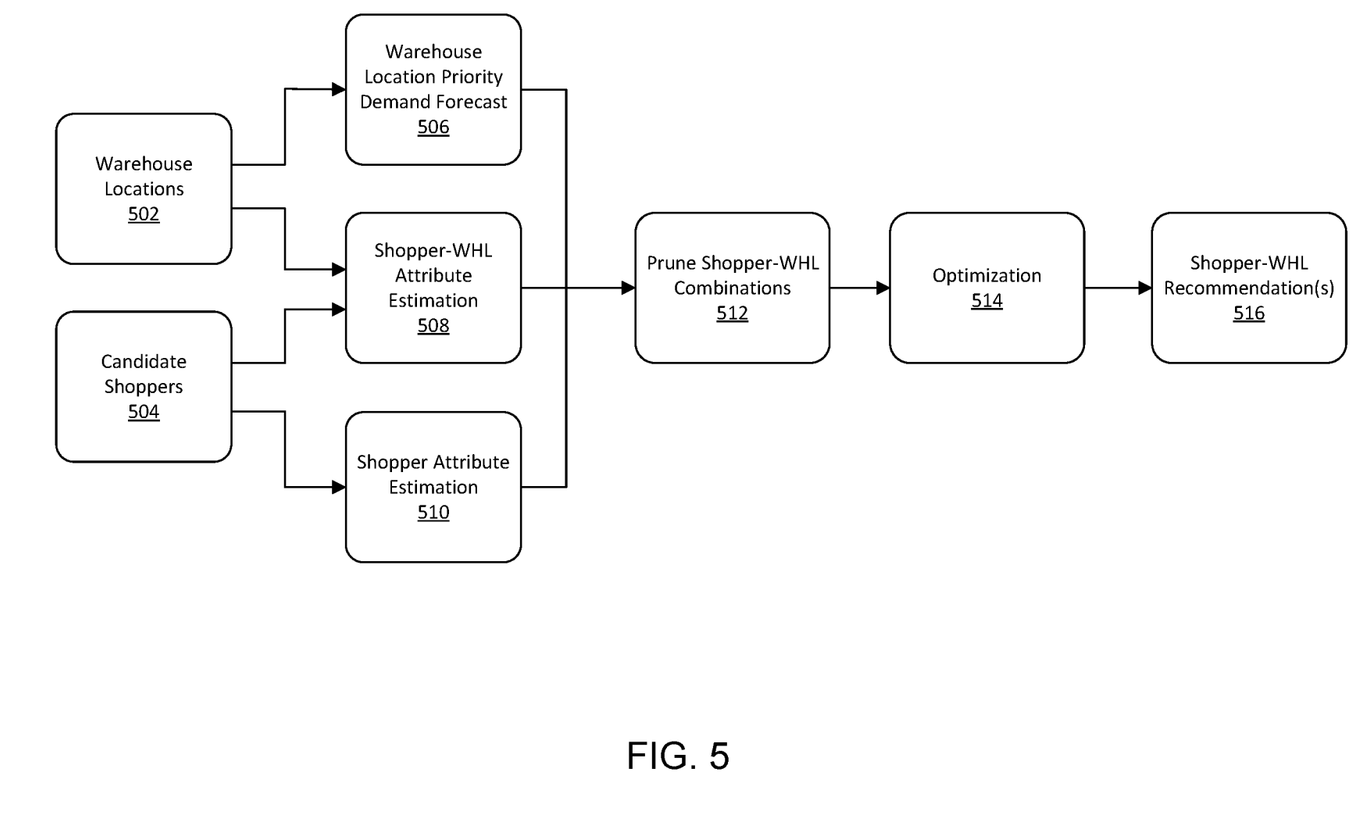
FIG. 5 depicts an example system architecture, according to example embodiments of the present disclosure.
Figure 6A:
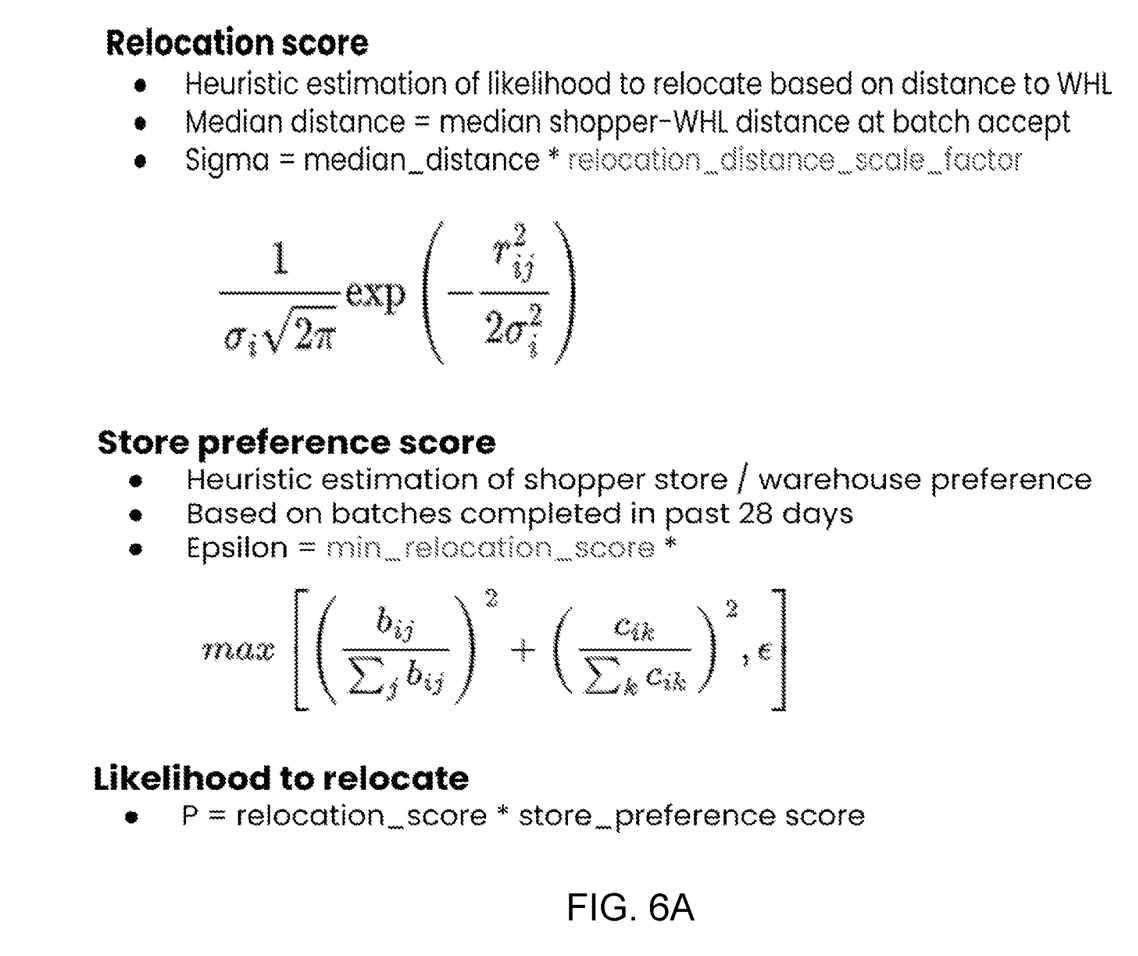
FIGS. 6A and 6B depict various example mathematical calculation, according to example embodiments of the present disclosure.
Figure 6B:
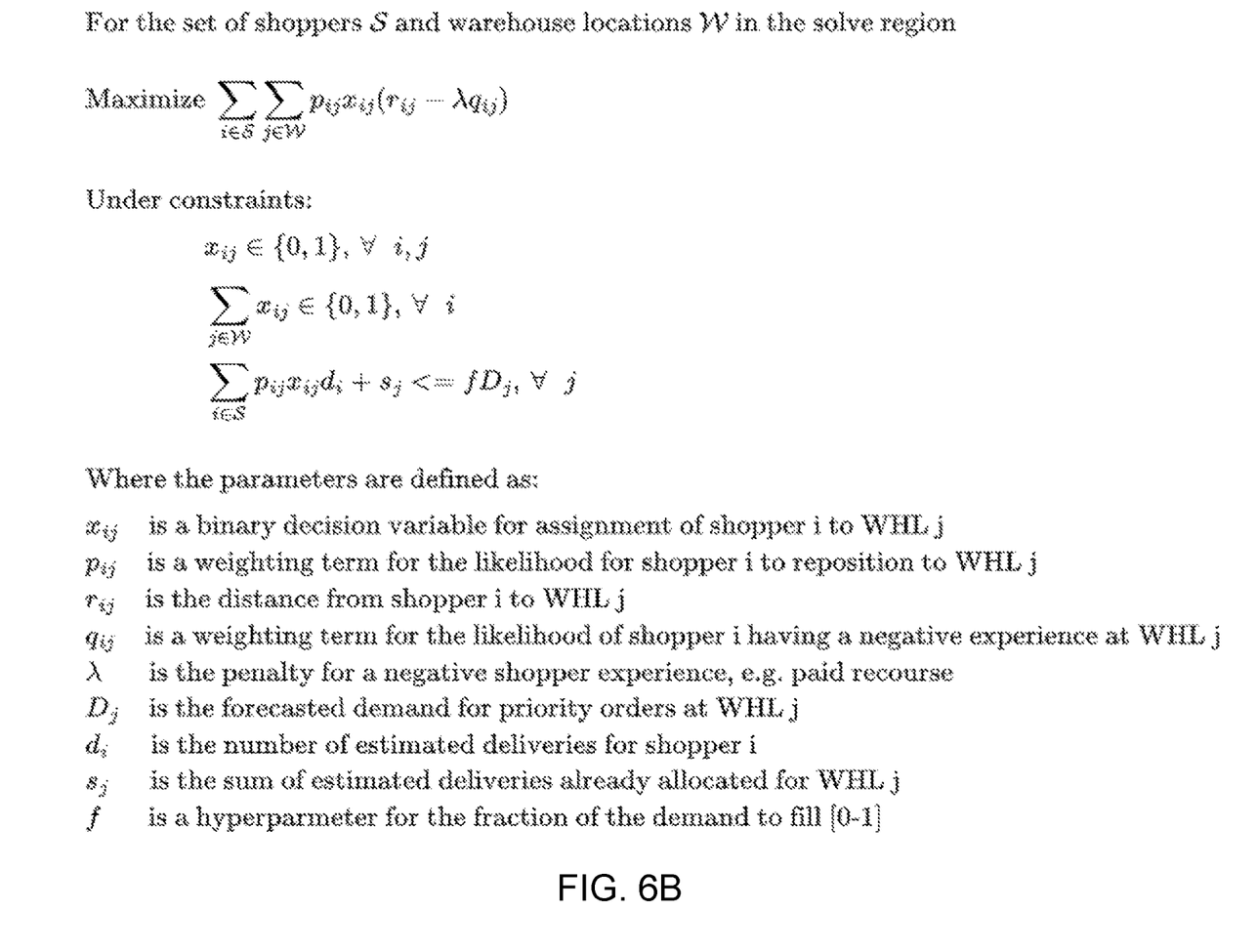

FIG. 5 depicts an example system architecture according to example embodiments of the present disclosure.

Referring to FIG. 5, one or more computing devices (e.g., associated with online concierge system 102, and/or the like) may identify (e.g., from amongst warehouses 210, and/or the like) a set of available warehouse locations 502 associated with online concierge system 102 and located in a given geographic area. Similarly, the computing device(s) may identify (e.g., from amongst shoppers 208, and/or the like) a set of available shoppers 504 associated with online concierge system 102 and located in the given geographic area.

Based at least in part on the set of available warehouse locations 502, and/or the like, the computing device(s) may determine a warehouse-location-priority-demand forecast 506. Based at least in part on the set of available warehouse locations 502, the set of available shoppers 504, and/or the like, the computing device(s) may determine a shopper-warehouse-location-attribute estimation 508 (e.g., based at least in part on one or more determined reductions in travel time, shopper-engagement likelihoods, bad-experience likelihoods, and/or the like). Based at least in part on the set of available shoppers 504, and/or the like, the computing device(s) may determine shopper-attribute estimation 510 (e.g., based at least in part on one or more retail/store preferences, delivery outputs, and/or the like).

The computing device(s) may determine a number of shopper-location combinations and may prune therefrom (e.g., based at least in part on one or more coarse criteria, and/or the like) to generate a set of possible shopper-location pairs 512. Such a set of possible shopper-location pairs 512 may be optimized 514 (e.g., based at least in part on time required by the set of available shoppers 504 to travel from their respective current locations to one or more of the set of available warehouse locations 502, and/or the like) to determine (e.g., based at least in part on one or more machine learning (ML) models, and/or the like) a set of recommended shopper-location pairs 516, and/or the like.

In some embodiments, determining the set of recommended shopper-location pairs 516 may include minimizing the time required by the set of available shoppers 504 to travel from their respective current locations to the one or more of the set of available warehouse locations 502. Additionally or alternatively, determining the set of recommended shopper-location pairs 516 may include determining, for each shopper in the set of available shoppers 504, at least one reduction in time required by the shopper to travel from their current location to the one or more of the set of available warehouse locations 502.

In some embodiments, determining the set of recommended shopper-location pairs 516 may include maximizing an overall reduction in time required by the set of available shoppers 504 to travel from their respective current locations to the one or more of the set of available warehouse locations 502. Additionally or alternatively, determining the recommended set of shopper-location pairs may include determining, for each shopper in the set of available shoppers 504, a value for a function configured to determine a measure of productivity gains associated with the shopper traveling from their current location to at least one of the one or more of the set of available warehouse locations 502. In some embodiments, such a function may be configured to determine the measure of productivity gains based at least in part on a distance between the current location of the shopper and the at least one of the one or more of the set of available warehouse locations 502, a likelihood that the shopper will travel from their current location to the at least one of the one or more of the set of available warehouse locations 502, one or more predetermined preferred warehouse locations in the geographic area for the shopper, and/or the like.

In some embodiments, determining the set of recommended shopper-location pairs 516 may include determining, for each shopper in the set of available shoppers 504, a value for a function configured to determine a risk of loss of productivity associated with the shopper traveling from their current location to the at least one of the one or more of the set of available warehouse locations 502. In some embodiments, such a function may be configured to determine the risk of loss of productivity based at least in part on a likelihood the shopper will not receive a new order corresponding to the at least one of the one or more of the set of available warehouse locations 502 within a predefined period of time, and/or the like. Additionally or alternatively, determining the recommended shopper-location pairs 516 may include determining, for each shopper in the set of available shoppers 504, that the at least one of the one or more of the set of available warehouse locations 502 maximizes a difference between the value for the function configured to determine the measure of productivity gains and the value for the function configured to determine the risk of loss of productivity. For example, one or more of said determinations may be based at least in part on one or more of the calculations illustrated in FIGS. 6A and 6B, and/or the like.

Figure 7:
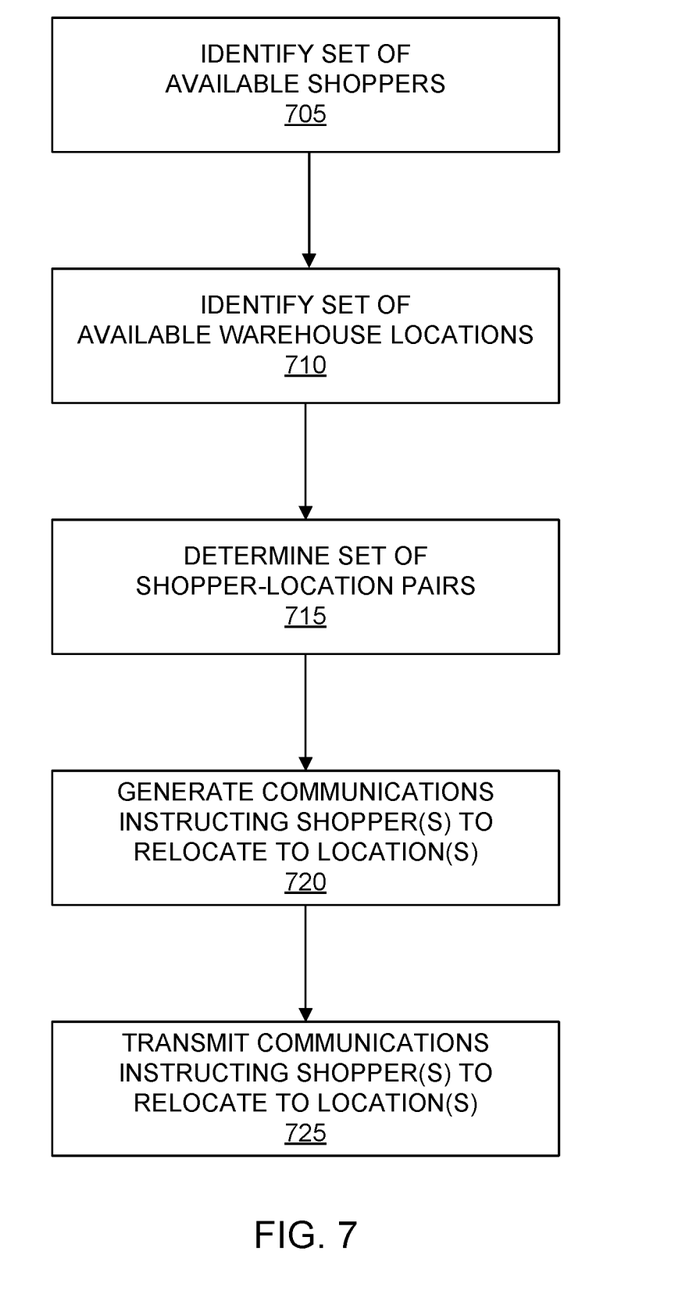
FIG. 7 depicts one or more example methods, according to example embodiments of the present disclosure.

FIG. 7 depicts one or more example methods according to example embodiments of the present disclosure. In various embodiments, the method(s) may include different or additional steps than those described in conjunction with FIG. 7. Further, in some embodiments, the steps of the method(s) may be performed in different orders than the order described in conjunction with FIG. 7. The method(s) described in conjunction with FIG. 7 may be carried out, for example, by the online concierge system 102 in various embodiments, while in other embodiments, the steps of the method(s) may be performed by any online system capable of retrieving items, performing one or more aspects of the functionality described herein, and/or the like.

Referring to FIG. 7, at (705), one or more computing devices may identify a set of available shoppers associated with an online shopping concierge platform and located in a geographic area. For example, one or more computing devices (e.g., associated with online concierge system 102, and/or the like) may identify the set of available shoppers 504, and/or the like.

At (710), the computing device(s) may identify a set of available warehouse locations associated with the online shopping concierge platform and located in the geographic area. For example, the computing device(s) may identify the set of available warehouse locations 502, and/or the like.

At (715), the computing device(s) may determine (e.g., based at least in part on the set of available shoppers, the set of available warehouse locations, and one or more machine learning (ML) models, and/or the like) a set of shopper-location pairs, for example, optimized based at least in part on time required by the set of available shoppers to travel from their respective current locations to one or more of the set of available warehouse locations. For example, the computing device(s) may determine (e.g., based at least in part on the set of available shoppers 504, the set of available warehouse locations 502, and one or more ML models, and/or the like) the set of recommended shopper-location pairs 516, which may be optimized 514, for example, based at least in part on time required by the set of available shoppers 504 to travel from their respective current locations to one or more of the set of available warehouse locations 502, and/or the like.

At (720), the computing device(s) may generate (e.g., based at least in part on the set of shopper-location pairs, and/or the like) communications dispatching, instructing, incentivizing, encouraging, and/or the like at least a portion of the available shoppers to relocate from their respective current locations to the one or more of the set of available warehouse locations. For example, the computing device(s) may generate (e.g., based at least in part on the recommended set of shopper-location pairs 516, and/or the like) communications dispatching, instructing, incentivizing, encouraging, and/or the like at least a portion of the available shoppers 504 to relocate from their respective current locations to the one or more of the set of available warehouse locations 502, and/or the like.

In some embodiments, generating such communications may include, for at least one shopper in the set of available shoppers 204, generating data indicating a financial incentive for the at least one shopper to complete one or more new orders associated with at least one of the one or more of the set of available warehouse locations 502, a financial hedge against the risk that the at least one shopper travels from their current location to at least one location of the one or more of the set of available warehouse locations 502 but does not receive a new order corresponding to the at least one location within a predefined period of time, and/or the like.

At (725), the computing device(s) may transmit (e.g., to one or more computing devices associated with the at least a portion of the available shoppers, and/or the like) the communications dispatching, instructing, incentivizing, encouraging, and/or the like the at least a portion of the available shoppers to relocate from their respective current locations to the one or more of the set of available warehouse locations. For example, the computing device(s) may transmit (e.g., to one or more computing devices associated with the at least a portion of the available shoppers 504, and/or the like) the communications dispatching, instructing, incentivizing, encouraging, and/or the like the at least a portion of the available shoppers 504 to relocate from their respective current locations to the one or more of the set of available warehouse locations 502, and/or the like.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, from one or more computing devices associated with a set of available shoppers, a location at a first timestamp of each available shopper in a geographic area;
   identifying a set of available warehouse locations associated with an online system and located in the geographic area;
   applying a demand forecast prediction model to the set of available warehouse locations to determine a forecasted demand for an upcoming period of time following the first timestamp for each of the set of available warehouse locations, wherein the demand forecast prediction model is trained by:
      collecting a first set of training examples comprising demand over a first set of periods of time,
      training the demand forecast prediction model with the first set of training examples,
      applying the demand forecast prediction model to a second set of periods of time to predict demand for the second set of periods of time,
      generating a second set of training examples comprising the predicted demands for the second set of periods of time, and
      retraining the demand forecast prediction model with the second set of training examples;
   determining, based at least in part on the set of available shoppers, the set of available warehouse locations, the forecasted demand for each of the set of available warehouse locations, and one or more machine learning (ML) models, a set of shopper-location pairs optimized based at least in part on time required by the set of available shoppers to travel from their respective current locations to one or more of the set of available warehouse locations;
   generating, based at least in part on the set of shopper-location pairs, a user interface for displaying communications of at least one of dispatching, instructing, incentivizing, or encouraging one or more of the available shoppers to relocate from their respective current locations to the one or more of the set of available warehouse locations; and
   transmitting, prior to the upcoming period of time for transmitting orders to the available shoppers and to one or more of the computing devices associated with a portion of the available shoppers, the user interface for presentation of the communications on the one or more computing devices associated with the portion of the available shoppers.

2. The computer-implemented method of claim 1, wherein determining the set of shopper-location pairs comprises minimizing the time required by the set of available shoppers to travel from their respective current locations to the one or more of the set of available warehouse locations.

3. The computer-implemented method of claim 1, wherein determining the set of shopper-location pairs comprises determining, for each shopper in the set of available shoppers, at least one reduction in time required by the shopper to travel from their current location to the one or more of the set of available warehouse locations.

4. The computer-implemented method of claim 1, wherein determining the set of shopper-location pairs comprises maximizing an overall reduction in time required by the set of available shoppers to travel from their respective current locations to the one or more of the set of available warehouse locations.

5. The computer-implemented method of claim 1, wherein determining the set of shopper-location pairs comprises determining, for each shopper in the set of available shoppers, a value for a function configured to determine a measure of productivity gains associated with the shopper traveling from their current location to at least one of the one or more of the set of available warehouse locations.

6. The computer-implemented method of claim 5, wherein the function configured to determine the measure of productivity gains is based at least in part on:
 a distance between the current location of the shopper and the at least one of the one or more of the set of available warehouse locations;
 a likelihood that the shopper will travel from their current location to the at least one of the one or more of the set of available warehouse locations; and
 one or more predetermined preferred warehouse locations in the geographic area for the shopper.

7. The computer-implemented method of claim 5, wherein determining the set of shopper-location pairs comprises determining, for each shopper in the set of available shoppers, a value for a function configured to determine a risk of loss of productivity associated with the shopper traveling from their current location to the at least one of the one or more of the set of available warehouse locations.

8. The computer-implemented method of claim 7, wherein the function configured to determine the risk of loss of productivity is based at least in part on a likelihood the shopper will not receive a new order corresponding to the at least one of the one or more of the set of available warehouse locations within a predefined period of time.

9. The computer-implemented method of claim 7, wherein determining the shopper-location pairs comprises determining, for each shopper in the set of available shoppers, that the at least one of the one or more of the set of available warehouse locations maximizes a difference between the value for the function configured to determine the measure of productivity gains and the value for the function configured to determine the risk of loss of productivity.

10. The computer-implemented method of claim 1, wherein generating the communications comprises, for at least one shopper in the set of available shoppers, generating data indicating at least one of:
 a financial incentive for the at least one shopper to complete one or more new orders associated with at least one of the one or more of the set of available warehouse locations; or
 a financial hedge against a risk that the at least one shopper travels from their current location to at least one location of the one or more of the set of available warehouse locations but does not receive a new order corresponding to the at least one location within a predefined period of time.

11. A system comprising:
one or more processors; and
a memory storing instructions that when executed by the one or more processors cause the system to perform operations comprising:
 for each shopper of a set of available shoppers associated with an online system and located in a geographic area:
  identifying a location at a first timestamp of the shopper in a geographic area;
  identifying a set of available warehouse locations associated with the online system and located in the geographic area;
  applying a demand forecast prediction model to the set of available warehouse locations to determine a forecasted demand for an upcoming period of time following the first timestamp for each of the set of available warehouse locations, wherein the demand forecast prediction model is trained by:
   collecting a first set of training examples comprising demand over a first set of periods of time,
   training the demand forecast prediction model with the first set of training examples,
   applying the demand forecast prediction model to a second set of periods of time to predict demand for the second set of periods of time,
   generating a second set of training examples comprising the predicted demands for the second set of periods of time, and
   retraining the demand forecast prediction model with the second set of training examples;
  determining, based at least in part on the set of available warehouse locations, the forecasted demand for each of the set of available warehouse locations, and one or more machine learning (ML) models, a set of shopper-location pairs optimized based at least in part on time required by the shopper to travel from their current location to one or more of the set of available warehouse locations;
  generating, based at least in part on the set of shopper-location pairs, a user interface for displaying communications at least one of dispatching, instructing, incentivizing, or encouraging the shopper to relocate from their current location to the one or more of the set of available warehouse locations; and
  transmitting, prior to an upcoming period of time for transmitting orders to the available shoppers and to a computing device associated with the shopper, the user interface for presentation of the communications the computing device associated with the shopper.

12. The system of claim 11, wherein determining the set of shopper-location pairs comprises minimizing the time required by the shopper to travel from their current location to the one or more of the set of available warehouse locations.

13. The system of claim 11, wherein determining the set of shopper-location pairs comprises determining, for each warehouse location of the one or more of the set of available warehouse locations, a value for a function configured to determine a measure of productivity gains associated with the shopper traveling from their current location to the warehouse location.

14. The system of claim 13, wherein determining the set of shopper-location pairs comprises determining, for each warehouse location of the one or more of the set of available warehouse locations, a value for a function configured to determine a risk of loss of productivity associated with the shopper traveling from their current location to the warehouse location.

15. The system of claim 14, wherein determining the shopper-location pairs comprises determining, for at least one warehouse location of the one or more of the set of available warehouse locations, that the at least one warehouse location maximizes a difference between the value for the function configured to determine the measure of productivity gains and the value for the function configured to determine the risk of loss of productivity.

16. A non-transitory computer-readable medium storing instructions that, when executed by a processor, cause the processor to perform operations comprising:
- identifying, from one or more computing devices associated with a set of available shoppers, a location at a first timestamp of each available shopper in a geographic area;
- identifying a set of available warehouse locations associated with an online system and located in the geographic area;
- applying a demand forecast prediction model to the set of available warehouse locations to determine a forecasted demand for an upcoming period of time following the first timestamp for each of the set of available warehouse locations, wherein the demand forecast prediction model is trained by:
  - collecting a first set of training examples comprising demand over a first set of periods of time,
  - training the demand forecast prediction model with the first set of training examples,
  - applying the demand forecast prediction model to a second set of periods of time to predict demand for the second set of periods of time,
  - generating a second set of training examples comprising the predicted demands for the second set of periods of time, and
  - retraining the demand forecast prediction model with the second set of training examples;
- determining, based at least in part on the set of available shoppers, the set of available warehouse locations, the forecasted demand for each of the set of available warehouse locations, and one or more machine learning (ML) models, a set of shopper-location pairs optimized based at least in part on time required by the set of available shoppers to travel from their respective current locations to one or more of the set of available warehouse locations;
- generating, based at least in part on the set of shopper-location pairs, a user interface for displaying communications of at least one of dispatching, instructing, incentivizing, or encouraging one or more of the available shoppers to relocate from their respective current locations to the one or more of the set of available warehouse locations; and
- transmitting, prior to the upcoming period of time for transmitting orders to the available shoppers and to one or more of the computing devices associated with a portion of the available shoppers, the user interface for presentation of the communications on the one or more computing devices associated with the portion of the available shoppers.

17. The non-transitory computer-readable medium of claim 16, wherein determining the set of shopper-location pairs further comprises minimizing the time required by the set of available shoppers to travel from their respective current locations to the one or more of the set of available warehouse locations.

18. The non-transitory computer-readable medium of claim 16, wherein determining the set of shopper-location pairs further comprises determining, for each shopper in the set of available shoppers, at least one reduction in time required by the shopper to travel from their current location to the one or more of the set of available warehouse locations.

19. The non-transitory computer-readable medium of claim 16, wherein determining the set of shopper-location pairs further comprises maximizing an overall reduction in time required by the set of available shoppers to travel from their respective current locations to the one or more of the set of available warehouse locations.

20. The non-transitory computer-readable medium of claim 16, wherein determining the set of shopper-location pairs further comprises determining, for each shopper in the set of available shoppers, a value for a function configured to determine a measure of productivity gains associated with the shopper traveling from their current location to at least one of the one or more of the set of available warehouse locations.

* * * * *